United States Patent
Bailey et al.

(10) Patent No.: US 10,616,210 B2
(45) Date of Patent: Apr. 7, 2020

(54) PROTECTION FEATURE FOR DATA STORED AT STORAGE SERVICE

(71) Applicant: MICROSOFT TECHNOLOGY LICENSING, LLC, Redmond, WA (US)

(72) Inventors: Steven Bailey, Bellevue, WA (US); John D. Rodrigues, Woodinville, WA (US); Filip Chelarescu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/241,116

(22) Filed: Aug. 19, 2016

(65) Prior Publication Data
US 2018/0054432 A1 Feb. 22, 2018

(51) Int. Cl.
*H04L 29/06* (2006.01)
*G06F 3/06* (2006.01)
(Continued)

(52) U.S. Cl.
CPC ............ *H04L 63/083* (2013.01); *G06F 3/067* (2013.01); *G06F 3/0614* (2013.01);
(Continued)

(58) Field of Classification Search
None
See application file for complete search history.

(56) References Cited

U.S. PATENT DOCUMENTS 6,336,175 B1  1/2002 Shaath et al.
7,143,092 B1  11/2006 Gregorat
(Continued)

FOREIGN PATENT DOCUMENTS

CN  105072135 A  11/2015
WO  2006114723 A2  11/2006

OTHER PUBLICATIONS

"Biba Model—Wikipedia, the Free Encyclopedia", Retrieved from: <<https://en.wikipedia.org/wiki/Biba_Model>> Jul. 2, 2017, 3 Pages.
(Continued)

*Primary Examiner* — Joseph P Hirl
*Assistant Examiner* — Hassan Saadoun
(74) *Attorney, Agent, or Firm* — Michael Best & Friedrich LLP

(57) ABSTRACT

Cloud-based storage services are provided for storing data across multiple devices, where access to the data is subject to a first authentication process. Embodiments are directed to a data protection feature to prevent accidental deletion or modification of the data stored at the cloud via unintended user actions on the clients or actions by nefarious software or hackers. For example, a data protection feature for a portion of data stored at the storage service may be selected, where the feature includes elevation of the first authentication process. An attempted operation performed on the portion of data may be detected. If the attempted operation is deletion or modification of the portion of data, a second authentication process may be prompted to enable the attempted operation to be performed on the portion of data at the storage service. The second authentication process may be elevated compared to the first authentication process.

14 Claims, 10 Drawing Sheets

(51) Int. Cl.
  *G06F 16/16* (2019.01)
  *G06F 21/62* (2013.01)
  *H04L 29/08* (2006.01)
  *G06F 21/31* (2013.01)
  *G06F 21/78* (2013.01)
  *H04W 12/06* (2009.01)

(52) U.S. Cl.
  CPC .......... *G06F 3/0622* (2013.01); *G06F 3/0637* (2013.01); *G06F 3/0653* (2013.01); *G06F 16/162* (2019.01); *G06F 21/31* (2013.01); *G06F 21/6218* (2013.01); *G06F 21/78* (2013.01); *H04W 12/06* (2013.01); *H04L 67/1097* (2013.01); *H04L 2463/082* (2013.01)

(56) References Cited

U.S. PATENT DOCUMENTS

| | | |
|---|---|---|
| 7,231,598 B1 | 6/2007 | Sawicki et al. |
| 7,363,330 B1 | 4/2008 | Ellman et al. |
| 7,962,950 B2 | 6/2011 | Choo et al. |
| 8,255,366 B1 | 8/2012 | Bagley et al. |
| 8,453,215 B1* | 5/2013 | LeBert .............. G06F 17/30362 726/4 |
| 8,504,532 B2 | 8/2013 | Saxena et al. |
| 8,819,208 B2 | 8/2014 | Wright |
| 8,856,256 B1 | 10/2014 | Srinivasan |
| 8,856,542 B2 | 10/2014 | Tatarinov et al. |
| 8,918,863 B1 | 12/2014 | Pendse |
| 9,037,825 B1 | 5/2015 | Donlan et al. |
| 9,237,170 B2 | 1/2016 | Kiang et al. |
| 9,292,687 B2 | 3/2016 | Thure et al. |
| 9,317,686 B1 | 4/2016 | Ye et al. |
| 9,912,752 B1 | 3/2018 | Davis et al. |
| 2002/0194177 A1 | 12/2002 | Sherman et al. |
| 2003/0023856 A1 | 1/2003 | Horne et al. |
| 2004/0068523 A1 | 4/2004 | Keith et al. |
| 2004/0107199 A1 | 6/2004 | Dalrymple, III et al. |
| 2004/0186858 A1 | 9/2004 | McGovern et al. |
| 2005/0114412 A1 | 5/2005 | Gerhard |
| 2006/0200623 A1 | 9/2006 | Gonzalez et al. |
| 2007/0044020 A1 | 2/2007 | Iwatsu et al. |
| 2007/0070218 A1 | 3/2007 | Meijer et al. |
| 2008/0091944 A1 | 4/2008 | Von Mueller et al. |
| 2008/0228578 A1 | 9/2008 | Mashinsky |
| 2010/0030819 A1 | 2/2010 | Srinivasan et al. |
| 2010/0197383 A1 | 8/2010 | Rader et al. |
| 2010/0312944 A1 | 12/2010 | Walker |
| 2011/0007076 A1 | 1/2011 | Nielsen et al. |
| 2013/0074193 A1* | 3/2013 | Baker ................. G06F 21/6218 726/28 |
| 2013/0144845 A1 | 6/2013 | Ghuge et al. |
| 2013/0151658 A1 | 6/2013 | Baker et al. |
| 2013/0198521 A1* | 8/2013 | Wu ..................... G06F 21/6209 713/175 |
| 2013/0244423 A1 | 9/2013 | Kolics |
| 2014/0019497 A1 | 1/2014 | Cidon et al. |
| 2014/0082749 A1 | 3/2014 | Holland et al. |
| 2014/0095727 A1 | 4/2014 | Evans et al. |
| 2014/0172799 A1* | 6/2014 | Dorman ............ G06F 17/30174 707/638 |
| 2014/0181057 A1* | 6/2014 | Euresti ................ G06F 17/3015 707/698 |
| 2014/0188808 A1 | 7/2014 | Wolf et al. |
| 2014/0258350 A1* | 9/2014 | Duval ............... G06F 17/30174 707/829 |
| 2014/0279498 A1 | 9/2014 | Qaim-maqami et al. |
| 2014/0310769 A1* | 10/2014 | O'Neill .................. H04L 63/10 726/1 |
| 2014/0337291 A1 | 11/2014 | Dorman et al. |
| 2014/0359085 A1 | 12/2014 | Chen |
| 2014/0372382 A1 | 12/2014 | Hrebicek et al. |
| 2015/0234612 A1 | 8/2015 | Himelstein et al. |
| 2015/0248384 A1 | 9/2015 | Luo et al. |
| 2015/0248631 A1 | 9/2015 | Brown |
| 2015/0312422 A1 | 10/2015 | Leemet et al. |
| 2015/0347552 A1 | 12/2015 | Habouzit et al. |
| 2016/0004882 A1 | 1/2016 | Ballai et al. |
| 2016/0006791 A1 | 1/2016 | Ladiwala |
| 2016/0019233 A1 | 1/2016 | Wijayaratne et al. |
| 2016/0026455 A1 | 1/2016 | Jeffrey et al. |
| 2016/0041972 A1 | 2/2016 | Lehmann et al. |
| 2016/0162374 A1 | 6/2016 | Mutha et al. |
| 2016/0267404 A1 | 9/2016 | Shicoff et al. |
| 2016/0380937 A1 | 12/2016 | Murphy et al. |
| 2017/0063906 A1 | 3/2017 | Muddu et al. |
| 2017/0228675 A1 | 8/2017 | Kisin et al. |
| 2018/0039551 A1 | 2/2018 | Rodrigues et al. |
| 2018/0039653 A1 | 2/2018 | Bailey et al. |
| 2018/0039654 A1 | 2/2018 | Rodrigues et al. |
| 2018/0039686 A1 | 2/2018 | Rodrigues et al. |
| 2018/0054480 A1 | 2/2018 | Bailey et al. |
| 2019/0258605 A1 | 8/2019 | Ballai et al. |

OTHER PUBLICATIONS

Chris, Hoffman, "How to Never Lose Files Stored in Dropbox and Other File-Syncing Services", Retrieved from: <<https://www.howtogeek.com/219299/ensure-youll-never-lose-files-stored-in-dropbox-and-other-file-syncing-services/>> Jun. 13, 2015, 6 Pages.

"International Search Report and Written Opinion Issued in PCT Application No. PCT/US2017/046672", dated Nov. 2, 2017, 13 Pages.

Callahan, Jane, "12 Advanced Dropbox Features That You Should Start Using", Published on: Jun. 23, 2015 Available at: https://zapier.com/blog/dropbox-hidden-features/.

Dewolf, John, "5 Tips to Secure Google Drive", Published on: Aug. 4, 2012 Available at: http://www.datto.com/blog/5-tips-to-secure-google-drive.

"Create Files and Folder but prevent Deletion and Modification", Published on: May 9, 2014 vailable at: http://superuser.com/questions/745923/ntfs-permissions-create-files-and-folder-but-prevent-deletion-and-modification.

"5 Security Features Missing from Consumer-Grade File Sync", Retrieved from: http://www.efolder.net/blog/5-security-features-missing-from-consumer-grade-file-sync/, Aug. 14, 2015, 3 Pages.

"Bulk delete", Retrieved from: https://help.podio.com/hc/en-us/articles/201019808-Bulk-delete, Jun. 2, 2016, 1 Page.

"Bulk Deleting Per-Job Screening Questions", Retrieved from: https://icare-test.icims.com/icimscustomer2/s/article/Bulk-Deleting-Per-Job-Screening-Questions, Jun. 2, 2016, 1 Page.

"Cryptolocker: What is and How to Avoid it", Retrieved from: https://www.pandasecurity.com/mediacenter/malware/cryptolocker/, May 14, 2015, 8 Pages.

"How to Stop Malware from Spreading through Cloud?", Retrieved from: https://storageservers.wordpress.com/2016/03/04/how-to-stopmalware-from-spreading-through-cloud-2/, Mar. 4, 2016, 2 Pages.

"Launching File Cloud 9.0-Encryption at Rest, Two Factor Authentication, File Locking, Real Time Network Share Sync, Network Share Recycle Bin, Multi-tenant site management and more", Retrieved from: https://web.archive.org/web/20150515231619/https://www.getfilecloud.com/blog/2015/05/launching-filecloud-9-0-encryption-at-rest-two-factor-authentication-file-locking-real-time-network-share-sync-network-share-recycle-bin-multi-tenant-site-management-and-more/, May 11, 2015, 7 Pages.

"My Files Were Corrupted or Renamed by Ransomware. What can I do?", Retrieved from: https://www.dropbox.com/en/help/8408, Retrieved on: Oct. 21, 2016, 4 Pages.

"The Ideal Dropbox Setup for External Hard Drives", Retrieved from: https://approductive.wordpress.com/2015/02/23/the-ideal-dropbox-setup-for-external-hard-drives/, Feb. 23, 2015, 32 Pages.

"Virus encrypted all google drive files—Cryptolocker virus", Retrieved from: https://productforums.google.com/forum/#!msg/drive/DmZKolcAPzg/siCsN_IZDIJ, Jun. 3, 2016, 4 Pages.

"Non Final Office Action Issued in U.S. Appl. No. 15/226,966", dated May 18, 2018, 20 Pages.

(56) References Cited

OTHER PUBLICATIONS

Blessings, Candace, "Cannot delete "all" messages . . . keep getting a Bulk Delete message", Retrieved from: https://productforums.google.com/forum/#!topic/gmail/rcMcG9PNPql, Mar. 5, 2016, 1 Page.

Han, et al., "MetaSync: Coordinating Storage across Multiple File Synchronization Services", In Journal of IEEE Internet Computing, vol. 20, Issue 3, May 1, 2016, pp. 36-44.

Hassancasa, "Decrypt and remove Teslacrypt 3.0 mp3 files", Retrieved from: https://forum.eset.com/topic/7435-decrypt-and-remove-teslacrypt-30-mp3-files/, Feb. 14, 2016, 15 Pages.

Kleczynski, Marcin, "Introducing the Malwarebytes Anti-Ransomware Beta", Retrieved from: https://blog.malwarebytes.org/malwarebytesnews/2016/01/introducing-the-malwarebytes-anti-ransomware-beta/, Jan. 25, 2016, 7 Pages.

Klein, Matt, "How to Save Drive Space by Offloading Local Files to the Cloud", Retrieved from: https://www.howtogeek.com/199099/save-drive-space-by-offloading-local-files-to-the-cloud/, Oct. 20, 2014, 8 Pages.

Nathan, "CryptoMonitor—Stop All Known Crypto-Ransomware Before It Encrypts Your Data", Retrieved from: https://www.bleepingcomputer.com/forums/t/572146/cryptomonitor-stop-all-known-crypto-ransomware-before-it-encrypts-your-data/, Apr. 3, 2015, 7 Pages.

"International Search Report and Written Opinion Issued in PCT Application No. PCT/US2017/043821", dated Nov. 8, 2017, 15 Pages.

"International Search Report and Written Opinion Issued in PCT Application No. PCT/US2017/044273", dated Sep. 27, 2017, 12 Pages.

"International Search Report and Written Opinion Issued in PCT Application No. PCT/US2017/046182", dated Oct. 18, 2017, 14 Pages.

Pena, Alexs, "How to Deal with Ransomware", Retrieved from: https://blogs.technet.microsoft.com/office365security/how-to-deal-with-ransomware/, Apr. 6, 2016, 10 Pages.

Ramasubramanian, et al., "Cimbiosys: A Platform for Content-based Partial Replication", In Proceedings of the 6th USENIX Symposium on Networked Systems Design and Implementation, Apr. 22, 2009, pp. 261-276.

Riva, et al., "Policy Expressivity in the Anzere Personal Cloud", In Proceedings of the 2nd ACM Symposium on Cloud Computing, Oct. 26, 2011, 14 Pages.

Tanous, Jim, "Why Amazon Cloud Drive Won't Replace Dropbox or OneDrive", Retrieved from: https://www.tekrevue.com/amazon-cloud-drive-ed/, Mar. 31, 2015, 9 Pages.

Thomas, Peter, "Detecting High Volume Copy Operations on Windows File Systems with LT Auditor+ 2013", Retrieved from: https://bluelance.com/blog-posts/detecting-high-volume-copy-operations-on-windows-file-systems-with-lt-auditor-2013, Jan. 14, 2016, 4 Pages.

"Final Office Action Issued in U.S. Appl. No. 15/226,966", dated Oct. 5, 2018, 27 Pages.

"Non Final Office Action Issued in U.S. Appl. No. 15/230,580", dated Oct. 15, 2018, 12 Pages.

"Non Final Office Action Issued in U.S. Appl. No. 15/238,869", dated Jun. 24, 2019, 12 Pages.

"Non Final Office Action Issued in U.S. Appl. No. 15/238,934", dated May 2, 2019, 9 Pages.

"Non Final Office Action Issued in U.S. Appl. No. 15/226,966", dated Mar. 8, 2019, 29 Pages.

"Final Office Action Issued in U.S. Appl. No. 15/230,580", dated Mar. 21, 2019, 11 Pages.

"Non Final Office Action Issued in U.S. Appl. No. 15/240,004", dated Mar. 8, 2019, 26 Pages.

"Notice of Allowance Issued in U.S. Appl. No. 15/230,580", dated Sep. 5, 2019, 9 Pages.

"Non Final Office Action Issued in U.S. Appl. No. 15/240,004", dated Sep. 18, 2019, 29 Pages.

"Notice of Allowance Issued in U.S. Appl. No. 15/238,934", dated Oct. 3, 2019, 9 Pages.

"Non Final Office Action Issued in U.S. Appl. No. 15/226,966" dated Oct. 31, 2019, 30 Pages.

"Final Office Action Issued in U.S. Appl. No. 15/238,869", dated Dec. 27, 2019, 12 Pages.

* cited by examiner

PROTECTION FEATURE FOR DATA STORED AT STORAGE SERVICE

BACKGROUND

Increasingly, cloud storage providers are utilized for storing and/or sharing data across multiple clients, where the cloud storage providers have engines that automatically synchronize the data between the clients. However, complaints are frequently received that the cloud storage providers are deleting or modifying data in the cloud via unintended user actions on the clients or actions by nefarious software or hackers. Because the data is synchronized to the cloud, the deletion or modification may be propagated to the cloud which further causes the delete to replicate to the other clients.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a data protection feature for data stored at a cloud-based storage service. Access to the data stored at the storage service may be subject to a first authentication process. The storage service may provide a selectable data protection feature for a portion of the data stored at the storage service, and may receive a selection of the data protection feature, where the data protection feature may include elevation of the first authentication process. The storage service may then detect an attempted operation performed on the portion of data at the storage service or receive detection of the attempted operation from a client device, and in response to a determination that the attempted operation is deletion or modification of the portion of data, the storage may prompt a second authentication process to enable the attempted operation to be performed on the portion of data at the storage service. The second authentication process may be elevated compared to the first authentication process.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
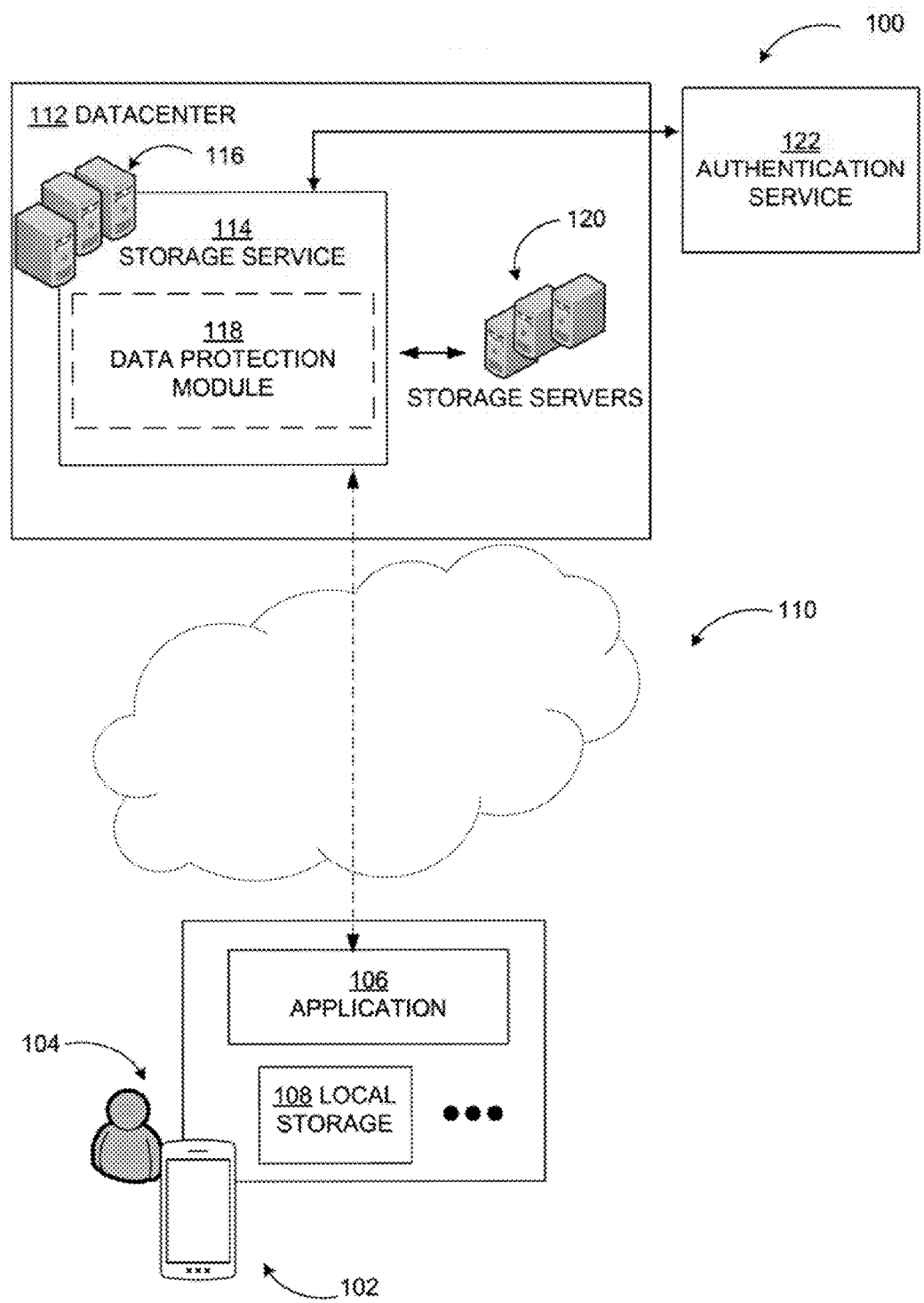
FIG. 1 includes an example network environment where a system to provide and implement protection features for data stored at a storage service may be implemented.

As briefly described above, embodiments are directed to a data protection feature for data stored at a cloud-based storage service. Access to the data stored at the storage service may be subject to a first authentication process, and the data protection feature may include elevation of the first authentication process. For example, the storage service may provide a selectable data protection feature for a portion of data stored at the storage service, and may receive a selection of the data protection feature. Alternatively, the storage service may automatically select the data protection feature for the portion of data. The storage service may detect an attempted operation performed on the portion of data at a client device where the portion of data is also stored locally. If the attempted operation is an addition of new data, the attempted operation may be performed on the portion of data at the storage service. However, if the attempted operation is deletion or modification of the portion of data, the storage service may prompt a second authentication process to enable the attempted operation to be performed on the portion of data at the storage service. The second authentication process may be elevated compared to the first authentication process. For example, the first authentication process may include a single-factor password authentication, whereas the second authentication process may include two-factor authentication, multi-device or multi-application authentication, biometric authentication, and/or smart card authentication.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing and/or implementing data protection features for data stored at a storage service. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where a system to provide and implement protection features for data stored at a storage service may be implemented.

As illustrated in diagram 100, an example system may include a datacenter 112 hosting a cloud-based storage service 114 configured to provide storage for and enable sharing of data that may be accessed across multiple devices and users. The datacenter 112 may include one or more processing servers 116 configured to execute the storage service 114, among other components. In some embodiments, at least one of the processing servers 116 may be operable to execute a data protection module 118 of the storage service 114, where the data protection module 118 may be integrated with the storage service 114 to prevent protected data from being deleted and/or modified at the storage service 114 to avoid accidental or nefarious data deletions or modifications from being propagated universally across the storage service 114 and/or multiple other devices. In other embodiments, this function may be inherently present within the storage service 114 itself. The datacenter 112 may also include one or more storage servers 120 configured to manage one or more data stores comprising data associated with the storage service 114 and/or data protection module 118. As described herein, the storage service 114 and/or data protection module 118 may be implemented as software, hardware, or combinations thereof.

In some embodiments, the storage service 114 may be configured to interoperate with various applications to synchronize data stored locally on user associated devices with the same data stored remotely at the storage service 114. For example, as illustrated in the diagram 100, a user 104 may execute a thin (e.g., a web browser) or a thick (e.g., a locally installed client application) version of an application 106 through the device 102 with which the storage service 114 may be configured to integrate and interoperate with over one or more networks, such as network 110. The application 106 may be an application hosted by the storage service, such as a synchronization client, for example. The device 102 may include a desktop computer, a laptop computer, a tablet computer, a vehicle mount computer, a smart phone, or a wearable computing device, among other similar devices. A communication interface may facilitate communication between the storage service 114 and the application 106 over the network 110.

In an example embodiment, the storage service 114 may be configured to receive data stored on local storage 108 of the device 102. The received data may be stored remotely at the storage service 114 within the storage servers 120, for example. Periodic synchronization between the data stored on local storage 108 of the device 102 and the content stored remotely at the storage service 114 may be performed to ensure a most updated version of the content is stored and/or shared at each location. Access to the data stored at the storage service 114 may be subject to an initial authentication process performed by at least one of the processing servers 116 of the storage service. The initial authentication process may be a single-factor authentication process, such as password authentication. In some examples, a data protection feature for a portion of the data stored at the storage service 114 may be provided and implemented, where the data protection feature may include elevation of the initial authentication process.

For example, the data protection module 118 may be configured to provide a selectable data protection feature for a portion of the data stored at the storage service 114 to the application 106. In some examples, the selectable data protection feature may be provided in response to storage of new data at the storage service, such as creation of a new file or folder, in response to movement of data to a new location at the storage service, and/or another type of modification to the data stored at the storage service. In other examples, the selectable data protection feature may be provided in response to a user request to protect the portion of the data. The application may display the selectable data protection feature to the user 104 through a user experience. The portion may include all of the data stored at the storage service 114, a file stored at the storage service 114, a folder stored at the storage service 114, and/or a group of files or folders stored at the storage service 114. The user 104 may be enabled to select the data protection feature through the user experience, and the data protection module 118 may receive the selection. In some examples, upon selection, the user 104 may be prompted by the data protection module 118 to perform a first elevated authentication process to enable the feature. The elevated authentication process may be performed by at least one of the processing servers 116 of the storage service 114 and/or by a separate authentication service 122.

There may be at least three types of factors that may authenticate the user 104: knowledge (something the user 104 knows, such as a password or a social security number), ownership (something the user 104 has, such as a card or another device), and inherence (something that represents the user 104 biologically, such as a fingerprint or iris pattern). As previously discussed, the initial authentication process may be a single-factor authentication process, such as password authentication. However, knowledge-based password authentication may be the easiest factor for nefarious software or hackers to forge because users often select weak passwords and/or use the same password with multiple services, which means a data breach of one service provider allows software or hackers to access all the other accounts that have the same username and password. Additionally, usernames and passwords are often compromised, such as through phishing attacks. Therefore, the first elevated authentication process may be elevated in comparison to the initial authentication process by combining multiple authentication factors (e.g., knowledge and ownership) or employing more unique authentication factors (e.g., inherence) to ensure that is the user 104 selecting to enable the data protection feature, not nefarious software or hackers. For example, the first elevated authentication process may include, but is not limited to two-factor authentication, multi-factor authentication, biometric authentication, and/or smart card authentication. Multi-factor authentication may include multi-device and/or multi-application authentication. For example, the user 104 may be asked to enter a code in addition to a username and password, where the code is generated using an application on the user's smart phone and/or the code is sent to the user 104 after entering the username and password via short message service (SMS) to the user's mobile device or by an automated phone call. Biometric authentication may include fingerprint recognition, voice recognition, facial recognition, eye scans, signature dynamics, and/or typing patterns of the user 104, among other examples. Smart card authentication may include implementation of cards embedded with integrated circuits that may store password files, PKI certificates, one-time password seed files, and/or biometric image templates securely.

In an alternate embodiment, the data protection module 118 may be configured to automatically select the data protection feature for the portion of data stored at the storage service 114. For example, the data protection module 118 may automatically select the data protection feature for particular types of data, such as data comprising precious memories (e.g., photos or videos) or important documents (e.g., tax returns). Additionally, the data protection module 118 may employ machine learning techniques such that the data protection feature is automatically selected for data based on a past history and/or pattern of data the user 104 has selected to protect.

The data protection module 118 may detect an attempted operation performed on the portion of data at the storage service 114. The attempted operation may be an addition of new data to the portion of data, a deletion of the portion of data, and/or a modification of the portion of data. The modification may include, among other things, one more edits to the portion of data, a movement of the portion of data to a new location, and/or a copy and paste function executed in conjunction with the movement of the portion of data to a new location. If the attempted operation is an addition of new data to the portion of data, the data protection module 118 may enable the attempted operation such that the new data may be stored at the storage service 114. If the attempted operation is deletion or modification of the portion of data, the data protection module 118 may prompt a second elevated authentication process to enable the attempted operation to be performed on the portion of data at the storage service 114.

The second elevated authentication process may be elevated in comparison to the initial authentication process, and may employ a same type of authentication as the first elevated authentication process or may employ a different type of authentication. In one example, both the first and second elevated authentication process may employ multi-device authentication. In another example, the first elevated authentication process may employ multi-application authentication and the second elevated authentication process may employ biometric authentication. Similar to the first elevated authentication process, the second elevated authentication process may be performed by at least one of the processing servers 116 of the storage service 114 and/or by the separate authentication service 122. If the second elevated authentication process is validated, the data protection module 118 may enable deletion or modification of the portion of data at the storage service 114. Additionally, in some embodiments, if the second authentication process is validated, the data protection feature for the portion of data may be automatically de-selected or disabled such that the portion of data stored at the storage service 114 is no longer protected from deletions or modifications. However, the user 104 may be enabled to re-select or re-enable the data protection feature at any time. In other examples, protection may be disabled temporarily for a subset of time and a subset of the user's data, after which it may be re-enabled automatically.

In another embodiment, the data protection module 118 may detect an attempted operation performed on the portion of data at a device, such as device 102, on which the portion of the data is also stored locally, where the attempted operation is provided to the storage service 114 through a synchronization process. If the attempted operation is addition of new data to the portion of data, the data protection module 118 may enable the new data to be uploaded to the portion of data stored at the storage service 114 through the synchronization process. However, if the attempted operation is deletion or modification of the portion of data, the data protection module 118 may place a hold on an upload of the deleted or modified data to the storage service 114 through the synchronization process in addition to prompting the second authentication process. The hold may be removed if the second elevated authentication process is validated to enable the attempted operation to be performed on the portion of data at the storage service 114. The criteria may include user not modifying the file often, or reading the data often (indicating importance), many files being deleted or encrypted at once, and other criteria.

Some of the actions and/or processes described herein have been illustrated from the perspective of a server (for example, the processing servers 116 configured to execute the storage service), however the same actions may be performed similarly by a client (for example, the application 106), among other entities. Additionally, some of the actions and/or processes described herein have been illustrated from the perspective of the client, however the same actions may be performed similarly by the server.

Conventionally, some cloud-based storage services and/or providers may offer a selective synchronization functionality, which enables users the ability, per device, to select which data to synchronize up to the storage service or down to the device. However, when the selected data, such as a photograph, is deleted locally on a user device, that photograph may also be deleted from the cloud-based storage service. Therefore, if the user performs accidental deletes or modifications, or an application deletes or modifies data on behalf of the user without their knowledge, the deletions or modifications to the data may synchronize up to the storage service. Moreover, actions by nefarious software or hackers may cause deletions or modifications to the data at the storage service, where those deletions or modification may synchronize down to the device.

As described in FIG. 1, embodiments are directed to a data protection feature for data stored at cloud-based storage services to prevent unintended or nefarious deletions and/or modifications of one or more portions of the data stored at the storage service. User interactivity may be increased by enabling users or administrators to select the data protection feature to restrict deletions and/or modifications of the data stored at the storage service. Additionally, user efficiency may be increased when the storage service automatically selects the data protection feature based on a certain type of data and/or by employing machine learning techniques. Prompting elevated authentication processes to both enable and/or disable the data protection feature may enhance reliability by ensuring that only the user, not nefarious software or hackers, may control the feature, where the elevation also helps protect against accidental or unintended actions made by the user. Additionally, when the portion of data is locally deleted from or modified at a device, the storage service places a hold on synchronization with the device reducing processor and memory usage along with bandwidth usage due to reduced device-to-server communications. However, if the elevated authentication process is validated, then the hold may be removed and the deleted or modified portion of data may be synchronized to the storage service again enhancing user interactivity and reliability.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users storing and/or sharing content both locally at client devices and remotely at cloud-based storage services.

Figure 2:
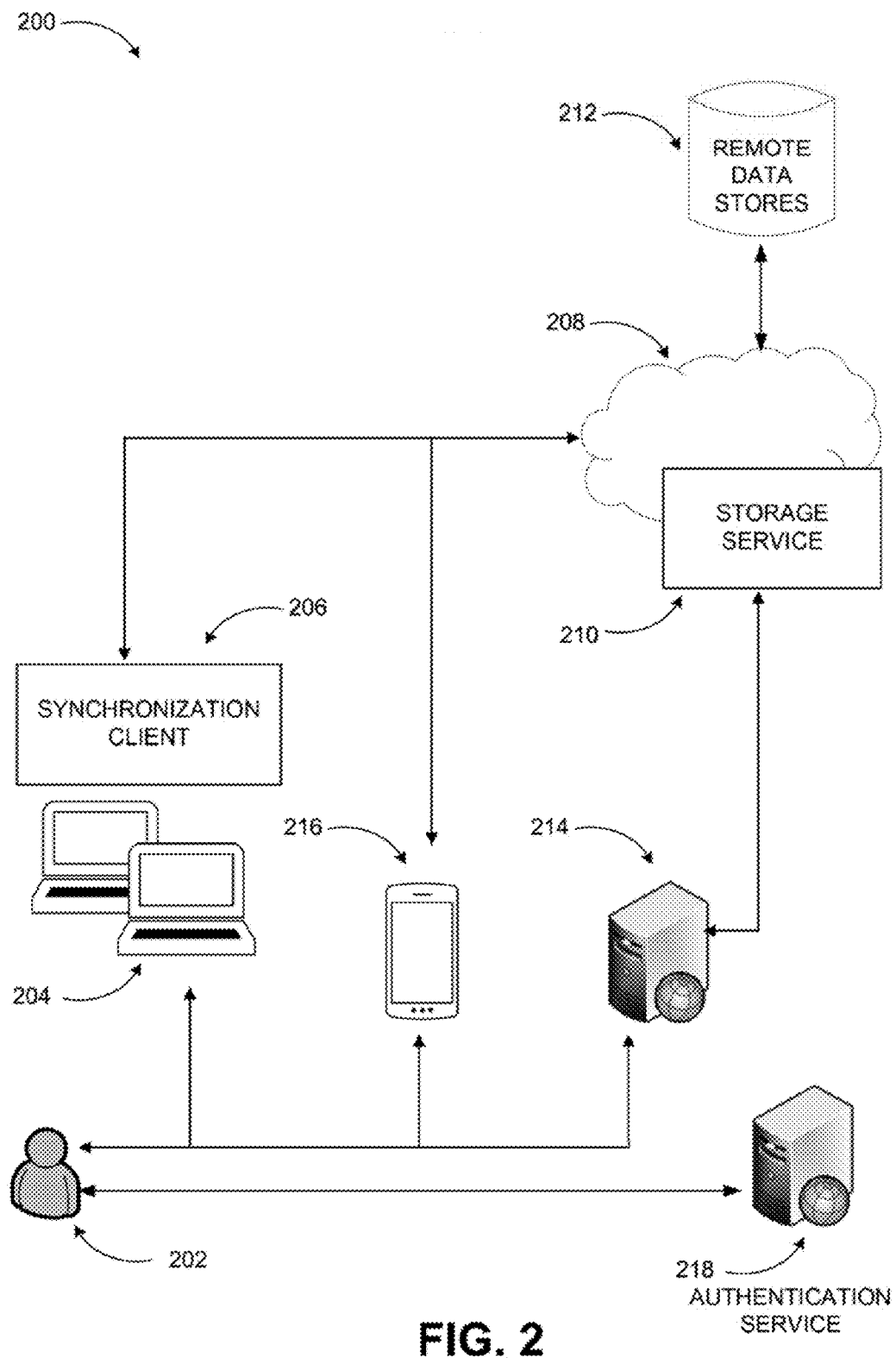
FIG. 2 includes a conceptual diagram illustrating an example process to provide and implement protection features for data stored at a storage service.

FIG. 2 includes a conceptual diagram illustrating an example process to provide and implement protection features for data stored at a storage service. As shown in a diagram 200, a storage service 210 may be configured to receive data stored locally on one or more devices 204 associated with a user 202 (or administrator). The storage service 210 may receive the data over one or more networks, such as network 208, and the received data may be stored within one or more remote data stores 212 at the storage service 210, for example. Periodic synchronization between the data stored on the devices 204 and the data stored within one or more remote data stores 212 may be performed through a synchronization client 206 executed on the devices 204. Access to the data stored at the storage service 210 may be subject to an initial authentication process performed by the storage service 210, where the initial authentication process may be a single-factor authentication process, such as password authentication.

A selectable data protection feature for a portion of the data stored at the storage service 210 may be provided and implemented, where the data protection feature may include elevation of the initial authentication process. In one example, the storage service 210 may be configured to provide the selectable data protection feature to the user 202 (or administrator) through one or more of a web application or an application programming instance (API) executing on a server 214 the user 202 is interacting with via the devices 204, for example. In another example, the storage service 210 may be configured to provide the selectable data protection feature to the user 202 through the synchronization client 206 executing on one or more of the devices 204. In a further example, the storage service 210 may be configured to provide the selectable data protection feature to the user 202 through a mobile device 216 associated with the user 202 via a short message service (SMS), for example.

The user 202 may be enabled to select the data protection feature through the web application or an application programming instance (API) executing on a server 214, the synchronization client 206 executing on one or more of the devices 204, or the mobile device 216. Upon selection, the user 202 may be prompted by the storage service 210 to perform a first elevated authentication process to enable the feature. The first elevated authentication process may be performed by the storage service 210 and/or by a separate authentication service 218. The first elevated authentication process may be elevated in comparison to the initial authentication process. For example, the first elevated authentication process may include, but is not limited to, two-factor authentication, multi-device or multi-application authentication, biometric authentication, and/or smart card authentication.

The storage service 210 may detect an attempted operation performed on the portion of data at the storage service 210, where the attempted operation may be an addition of new data to the portion of data, a deletion of the portion of data, and/or a modification of the portion of data. If the attempted operation is an addition of new data to the portion of data, the storage service 210 may enable the attempted operation such that the new data may be added to the portion of data stored at the storage service 210. If the attempted operation is deletion or modification of the portion of data, the storage service 210 may prompt a second elevated authentication process to enable the attempted operation to be performed on the portion of data at the storage service 210. The second elevated authentication process may be elevated in comparison to the initial authentication process, and may employ a same type of authentication as the first elevated authentication process or may employ a different type of elevated authentication. Similar to the first elevated authentication process, the second elevated authentication process may be performed by the storage service 210 and/or by the separate authentication service 218. If the second elevated authentication process is validated, the storage service 210 may enable the deletion or modification of the portion of data at the storage service 210.

In some examples, if the attempted operation is deletion or modification of the portion of data, the storage service 210 may provide an error notification to the user 202 through the web application or an application programming instance (API) executing on the server 214, the synchronization client 206 executing on one or more of the devices 204, or the mobile device 216. The error notification may include an option to de-select or disable the data protection feature for the portion of data. If the option to de-select or disable the data protection feature is selected, the storage service may then prompt the second elevated authentication process to enable the attempted operation to be performed on the portion of data at the storage service 210.

Alternatively, the storage service 210 may detect an attempted operation performed on the portion of data at one of the devices 204, on which the portion of the data is also stored locally, where the attempted operation is provided to the storage service 210 through the synchronization client 206. If the attempted operation is addition of new data to the portion of data, the storage service 210 may enable the new data to be uploaded to the portion of data stored at the storage service 210 through the synchronization client 206. However, if the attempted operation is deletion or modification of the portion of data, the storage service 210 may place a hold on an upload of the deleted or modified data to the storage service 210 through the synchronization client 206, in addition to prompting the second authentication process. The hold may be removed if the second elevated authentication process is validated to enable the attempted operation to be performed on the portion of data at the storage service 210.

Figure 3A:
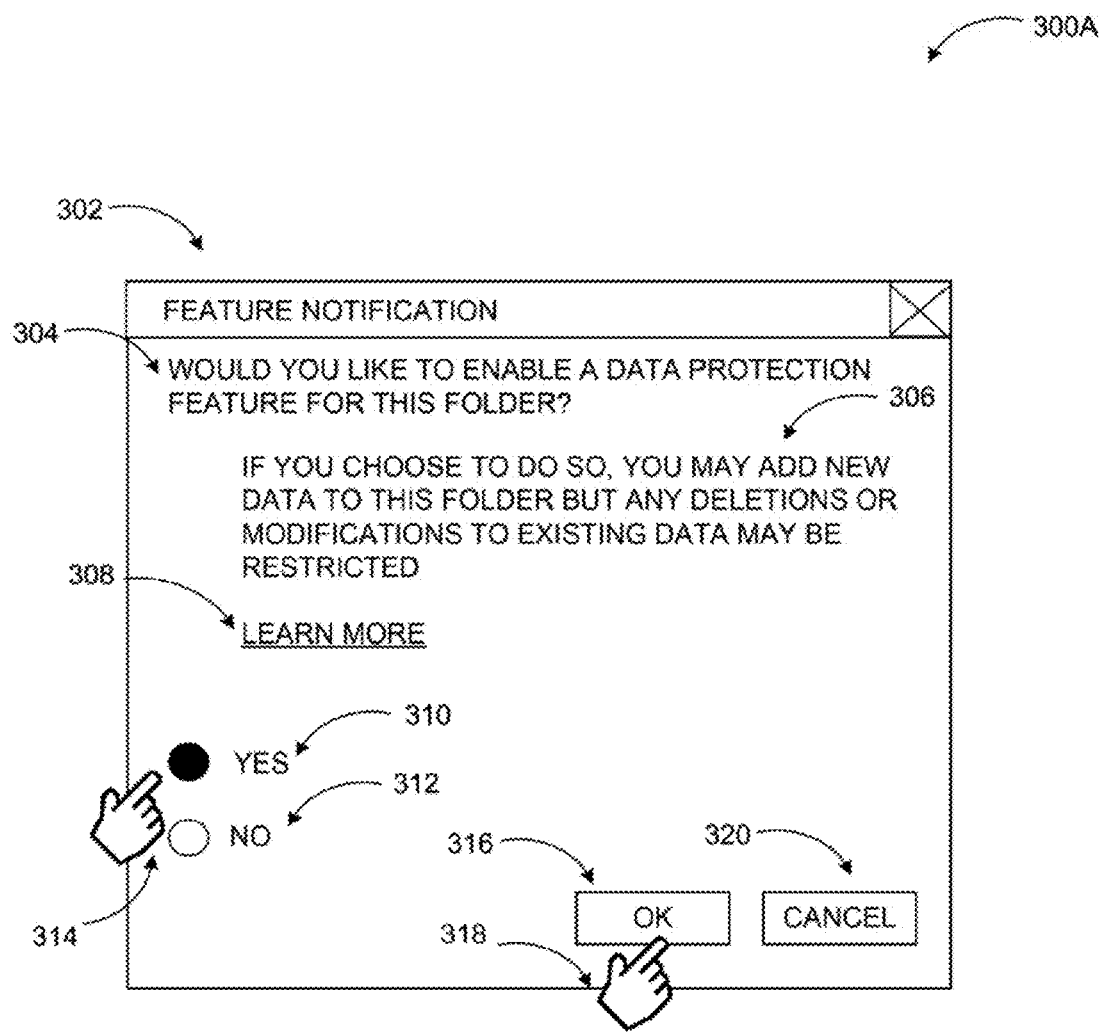
FIGS. 3A-B include example notifications provided to enable selection of a data protection feature for a portion of data stored at the storage service.
Figure 3B:
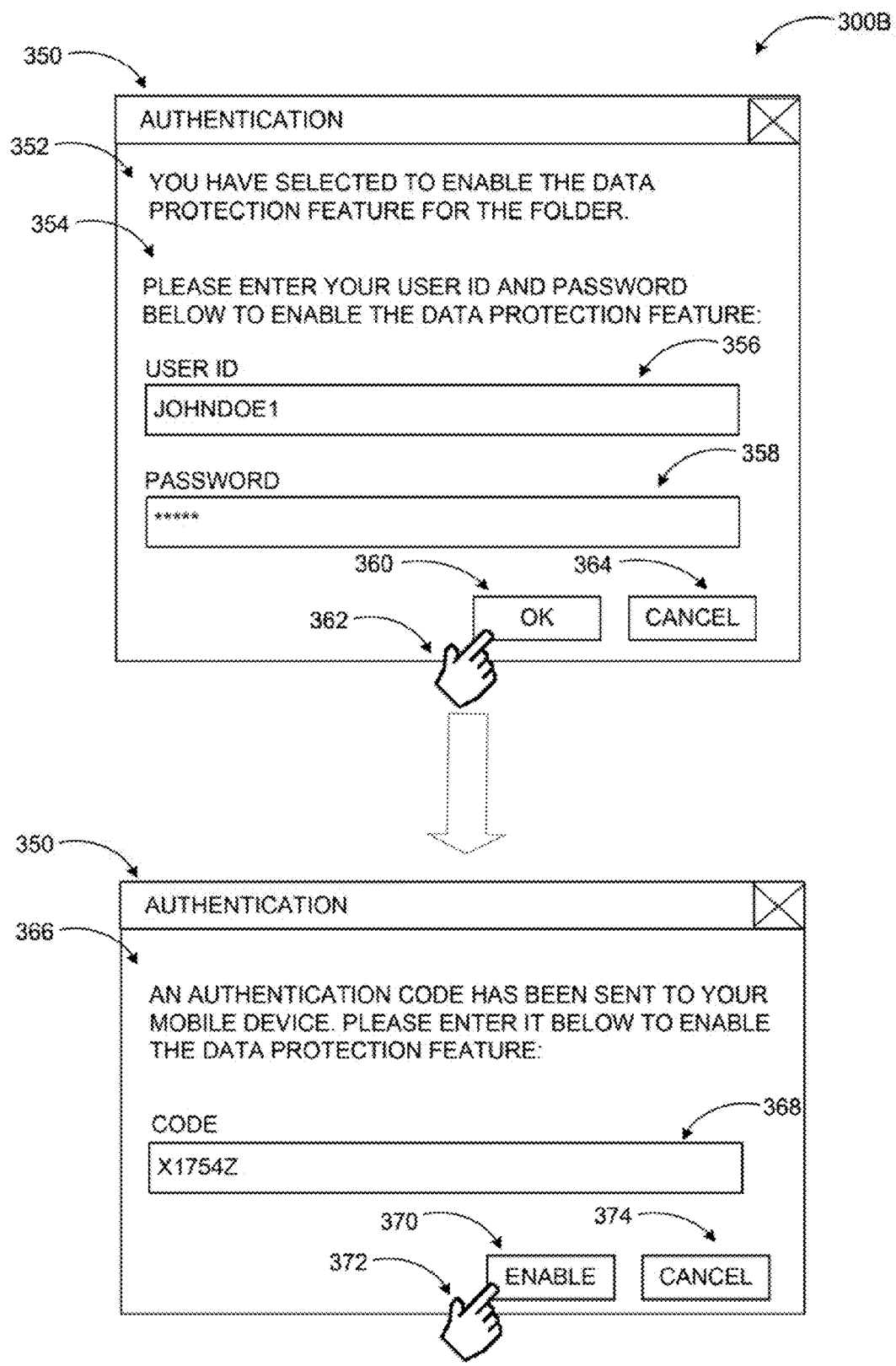

FIGS. 3A-B include example notifications; provided to, enable selection of a data protection feature for a portion of data stored at the storage service. A cloud-based storage service may be configured to provide storage for and enable sharing of data that may be accessed across multiple devices and users. Access to the data stored at the storage service may be subject to a first authentication process performed by the storage service. In some embodiments, a selectable data protection feature for a portion of the data stored at the storage service may be provided, where the data protection feature may include elevation of the first authentication process. The portion of data may include all data stored at the storage service or data within a file, a folder, and/or a group of files or folders stored at the storage service.

In an example scenario, a user may create a new folder to store personal photographs and videos at the storage service. In response to the creation of the new folder, the storage service may be configured to provide a selectable data protection feature for the folder to a synchronization client executing on a device associated with the user. The synchronization client may display the selectable data protection feature to the user as a feature notification 302 through a user interface associated with the synchronization client, as illustrated in diagram 300A of FIG. 3A.

The feature notification 302 may be presented as a dialog box, a notification window, and/or a pane, among other examples. The feature notification 302 may include a main instruction 304 and a prompt 306 followed by two possible selections ("yes" 310 and "no" 312). As illustrated, the main instruction 304 may inquire whether the user would like to enable a data protection feature for the folder. The prompt 306 may describe the effects and/or purpose of enabling the data protection feature for the folder. For example, the prompt 306 may indicate that if the data protection feature is enabled new data may be added to the folder but any deletions or modifications the existing data may be restricted. The prompt 306 may also include a link 308 to more detailed information regarding these effects and/or purpose.

The user may select either "yes" 310 or "no" 312 in response to the main instruction 304. If the user does not wish to enable the data protection feature, the user may select "no" 312, and then an "OK" command control 316. Alternatively, the user may select a "Cancel" command control 320. Without the data protection feature enabled, any changes, including additions, deletions, and/or modifications to data within the folder may be enabled at the storage service. In response to a first user selection 314 of "yes" 310, and a second user selection 318 of the "OK" command control 316, an authentication prompt 350 may be displayed, as shown in a diagram 300B of FIG. 3B.

The authentication prompt 350 may indicate the action selected by the user 352. For example, selection to enable the data protection feature for the folder. The authentication prompt 350 may further provide a first set of instructions 354 for an elevated, second authentication process. The second authentication process may be a multi-device authentication process. For example, the user may need to enter a code in addition to a username and password, where the code may be sent to the user's mobile device via short message service (SMS) after the user enters a username and password. Therefore, the first set of instructions 354 may include for the user to enter a username and password in the text boxes 356, 358 provided within the authentication prompt 350, respectively, in order to enable the data protection feature. If the user no longer wishes to enable the data protection feature, the user may select a "Cancel" command control 364.

In response to a user selection 362 of an "OK" command control 360 (after entry of the username and password), the authentication prompt 350 may display a second set of instructions 366. The second set of instructions 366 may indicate that an authentication code has been sent to the user's mobile device, and for the user to enter the authentication code in the text box 368 provided within the authentication prompt 350 in order to enable the data protection feature. After entry of the authentication code into the text box 368, the user may select 372 an "Enable" command control 370, as illustrated. Alternatively, if the user no longer wishes to enable the data protection feature, the user may select a "Cancel" command control 374.

If the authentication code is validated, the data protection feature may be enabled for the folder such that any deletions and/or modifications to data within the folder are restricted at the storage service. A same and/or similar elevated authentication process to the second authentication process discussed above may be prompted in order to disable and/or de-select the data protection feature for the folder, as will be discussed in detail in FIGS. 4A-B below.

Figure 4A:
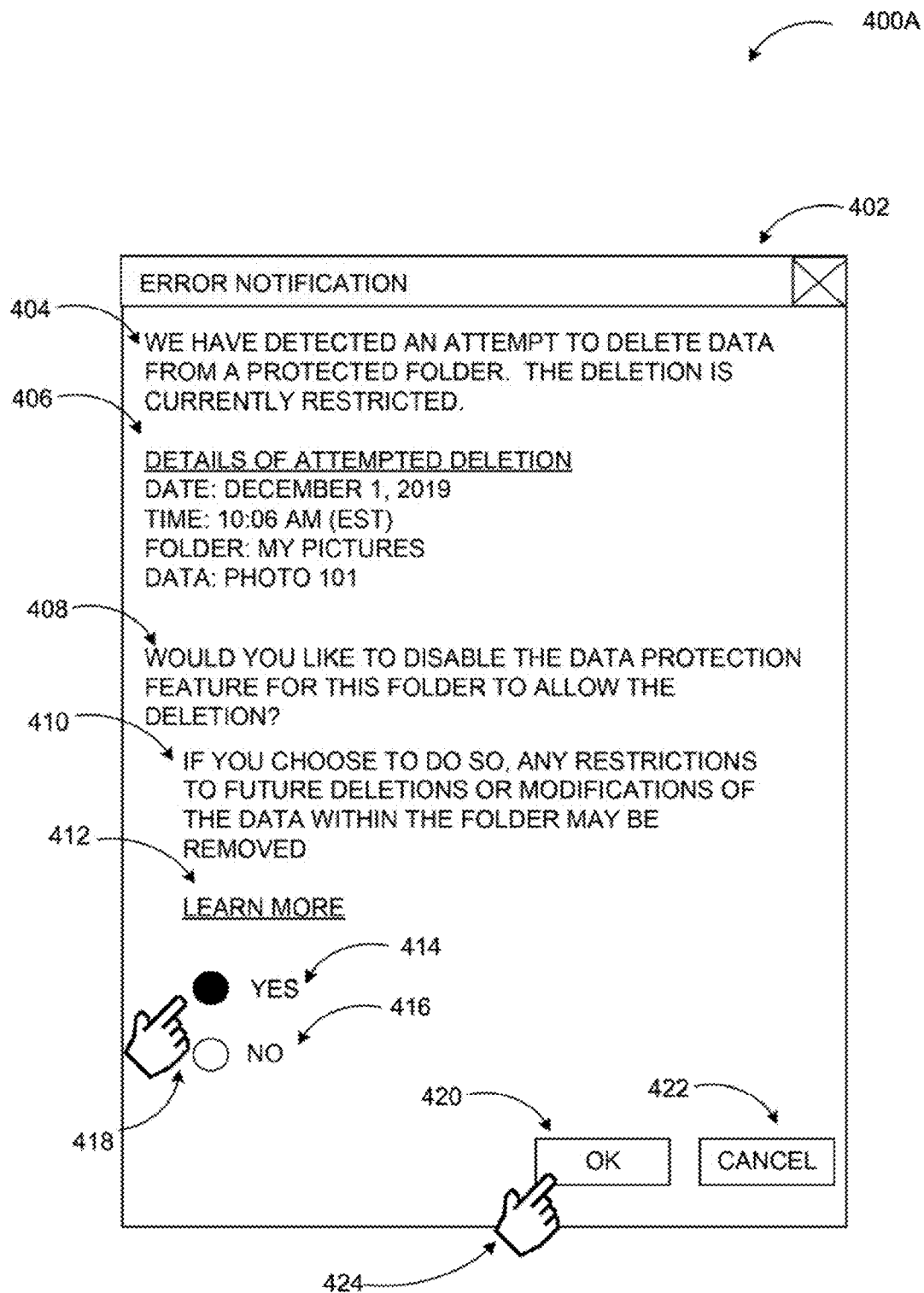
FIGS. 4A-B include example notifications provided in response to a determination that an attempted operation performed on a portion of data stored at the storage service is deletion or modification of the portion of data.
Figure 4B:
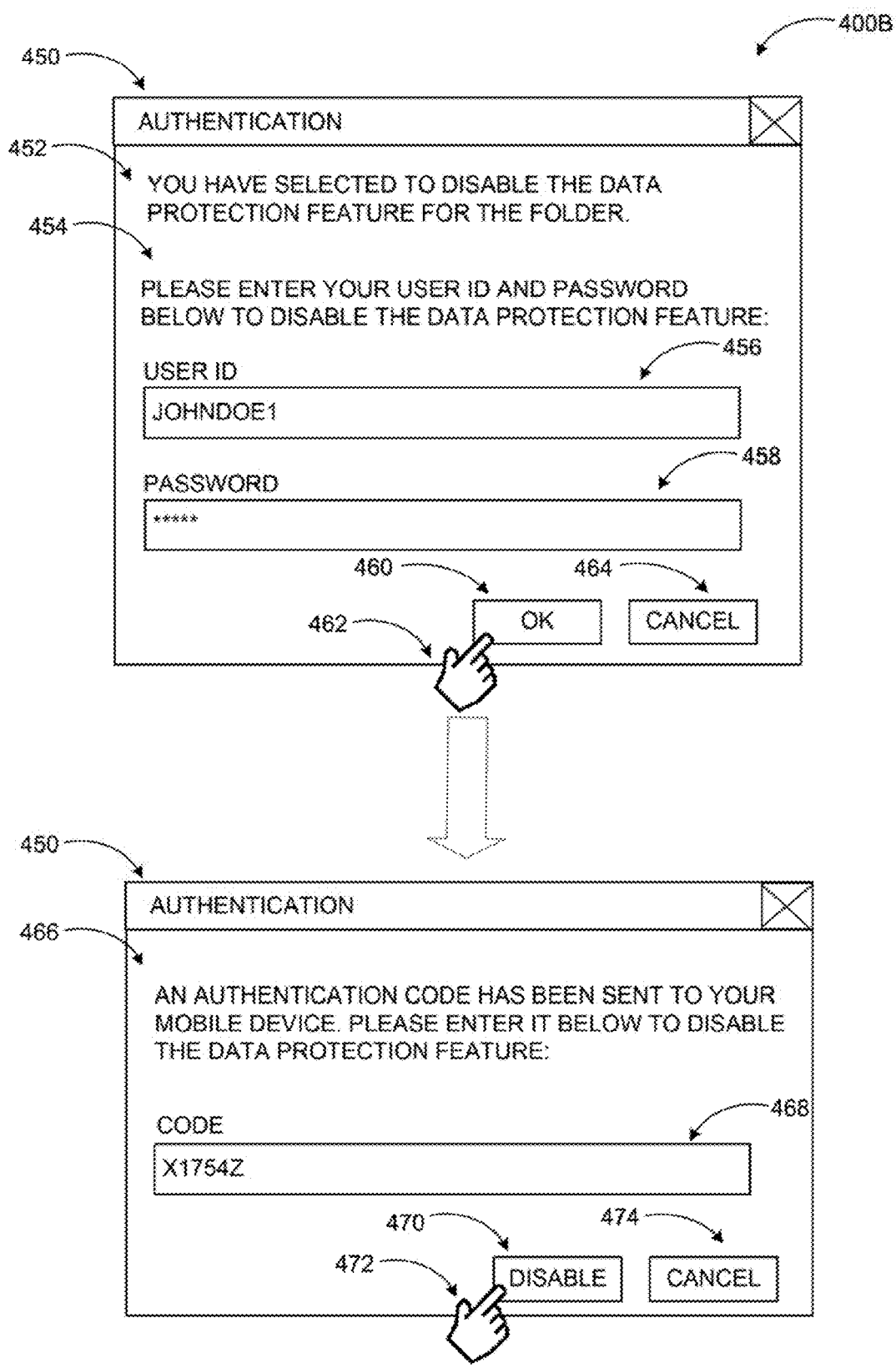

FIGS. 4A-B include example notifications provided in response to a determination that an attempted operation performed on a portion of data stored at a storage service is deletion or modification of the portion of data.

A data protection feature may be selected and enabled for a folder stored at the storage service through a process described in detail in FIGS. 3A-B above. Continuing with the same example scenario discussed in FIGS. 3A-B, the folder may store personal photographs and/or videos associated with the user. The storage service may detect an attempted deletion performed on a photograph within the folder at the storage service. In response to the attempted deletion, the storage service may provide an error notification 402 to a synchronization client executing on a device associated with the user. The synchronization client may display the error notification 402 to the user through a user interface associated with the synchronization client, as illustrated in diagram 400A of FIG. 4A.

The error notification 402 may be presented as a dialog box, a notification window, and/or a pane, among other examples. The error notification may indicate the attempted operation 404. For example, the error notification 402 may indicate that an attempted deletion of data within a protected folder was detected. In some embodiments, the error notification 402 may further provide details of the attempted deletion 406, such as a date and time of the deletion, a name of the folder comprising the data attempted to be deleted, and name of the data attempted to be deleted. The error notification 402 may further include a main instruction 408 and a prompt 410 followed by two possible selections ("yes" 414 and "no" 416). As illustrated, the main instruction 408 may inquire whether the user would like to disable the data protection feature for the folder in order to allow the deletion. The prompt 410 may describe the effects and/or purpose of disabling the data protection feature for the folder. For example, the prompt 410 may indicate that if the data protection feature is disabled not only will this data be deleted but future deletions and/or modifications of the data within this folder may not be restricted at the storage service. The prompt 410 may also include a link 412 to more detailed information regarding these effects and/or purpose.

The user may select either "yes" 414 or "no" 416 in response to the main instruction 408. If the user does not wish to disable the data protection feature, the user may select "no" 416, and then an "OK" command control 420. Alternatively, the user may select a "Cancel" command control 422. In response to a first user selection 418 of "yes" 414, and a second user selection 424 of the "OK" command control 420, an authentication prompt 450 may be displayed, as shown in a diagram 400B of FIG. 4B.

The authentication prompt 450 may indicate the action selected by the user 452. For example, the user selected to disable the data protection feature for the folder. The authentication prompt 450 may further provide a first set of instructions 454 for an elevated authentication process. The elevated authentication process may be elevated in comparison to an initial authentication process to access the data at the storage service, and may employ a same type of authentication as the elevated authentication process prompted to enable the data protection feature as discussed in conjunction with FIG. 3B (e.g., the multi-device authentication process). For example, the user may need to enter another code (i.e., the code is unique from the code entered to enable the data protection feature) in addition to a username and password, where the code may be sent to the user's mobile device via short message service (SMS) after the user enters a username and password. Therefore, the first set of instructions 454 may include for the user to enter a username and password in the text boxes 456, 458 provided within the authentication prompt 450, respectively, in order to disable the data protection feature. If the user no longer wishes to disable the data protection feature, the user may select a "Cancel" command control 464. In response to a user selection 462 of an "OK" command control 460 (after entry of the username and password), the authentication prompt 450 may provide a second set of instructions 466. The second set of instructions 466 may indicate that an authentication code has been sent to the user's mobile device, and for the user to enter the authentication code in the text box 468 provided within the authentication prompt 450 in order to disable the data protection feature. After entry of the authentication code into the text box 468, the user may select 472 a "Disable" command control 470, as illustrated. Alternatively, if the user no longer wishes to disable the data protection feature, the user may select a "Cancel" command control 474.

In other embodiments, the elevated authentication process may be elevated in comparison to the initial authentication process to access the data at: the storage service, but may employ a different type of authentication as the elevated authentication process prompted to enable the data protection feature. For example, instead of multi-device authentication, the elevated authentication process prompted to disable the data protection feature may employ one or more of two-factor authentication, multi-application authentication, biometric authentication, and/or smart card authentication may be employed.

Figure 5:
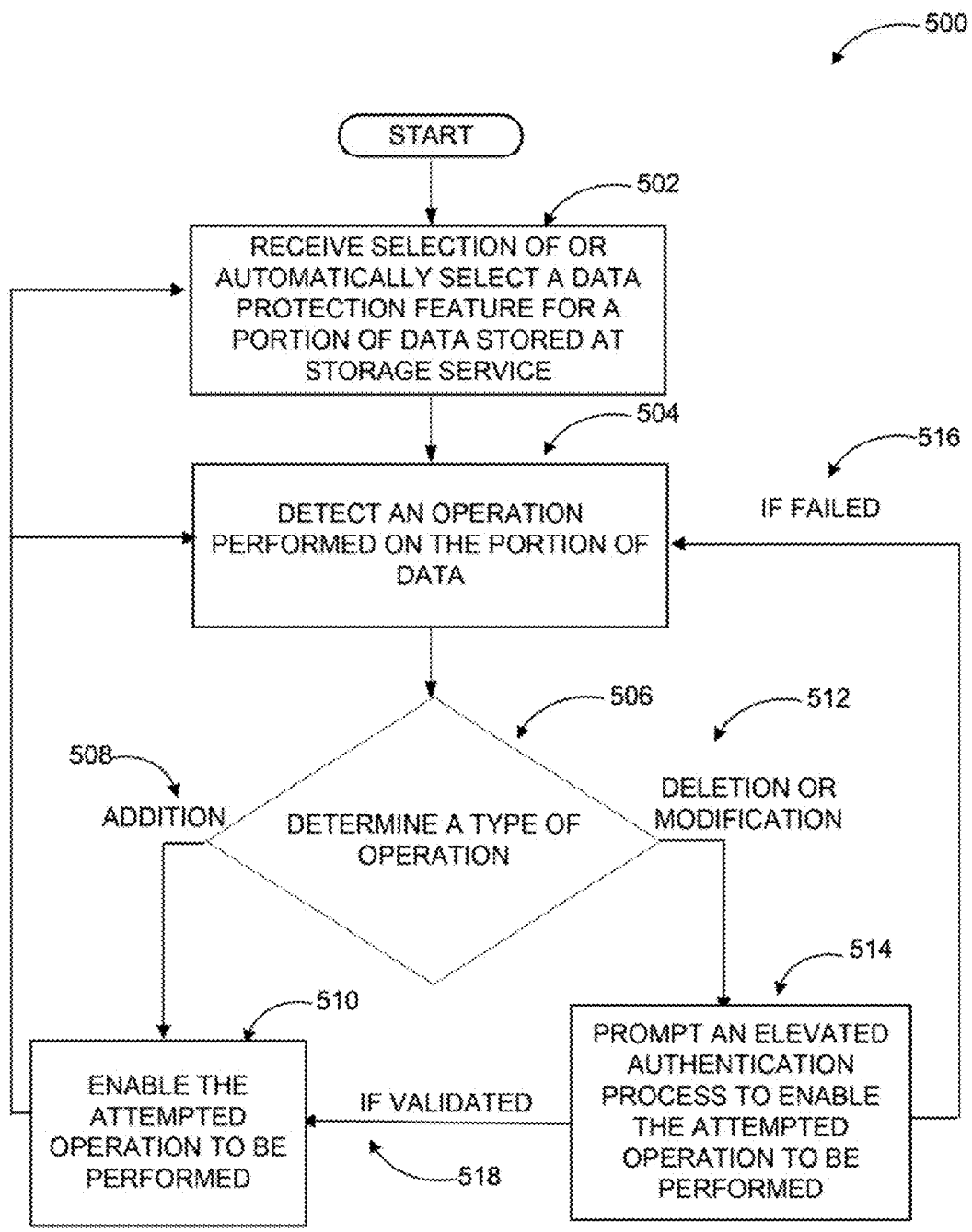
FIG. 5 includes a flow process illustrating how remotely stored data may be protected from deletion and/or modification through a selectable protection feature.

FIG. 5 includes a flow process illustrating how remotely stored data may be protected from deletion and/or modification through a selectable protection feature. As previously discussed, a cloud-based storage service may be configured to provide storage for and enable sharing of data that may be accessed across multiple devices and users. Access to the data stored at the storage service may be subject to a first authentication process performed by the storage service. In some embodiments, a selectable data protection feature for a portion of the data stored at the storage service may be provided, where the data protection feature may include elevation of the first authentication process. The portion of data may include all data stored at the storage service or data within a file, a folder, and/or a group of files or folders stored at the storage service.

For example, a selection of the data protection feature for a portion of the data stored at the storage service may be received and/or the data protection feature may be automatically selected for the portion of data 502. The storage service may then detect an attempted operation performed on the portion of data at the storage service or at a device on which the portion of data is stored locally 504. For the latter scenario, the attempted operation performed at the device may be provided to the storage service through a synchronization process, for example. A type of the operation may then be determined 506.

If the attempted operation is an addition of new data to the portion of data 508, the storage service may enable the attempted operation to be performed 510 such that the new data may be added to the portion of data stored at the storage service. Additionally, if the attempted operation was performed on the portion of data at one of the devices, the storage service may enable the new data to be uploaded to the portion of data stored at the storage service through the synchronization process. The process may then repeat at operation 504 when another attempted operation performed on the portion of data is detected.

If the attempted operation is deletion or modification of the portion of data 512, the storage service may prompt a second, elevated authentication process to enable the attempted operation to be performed on the portion of data at the storage service 514. The second authentication process may be elevated in comparison to the first authentication process. For example, the second authentication process may include two-factor authentication, multi-device or multi-application authentication, biometric authentication, and/or smart card authentication. Additionally, if the attempted operation was performed on the portion of data at one of the devices, the storage service may place a hold on an upload of the deleted or modified data to the storage service through the synchronization process, in addition to prompting the second authentication process.

If the second authentication process is failed 516 by the storage service and/or a separate authentication service, the storage service may fail the attempted operation to prevent the deletion or modification of the portion of data at the storage service and/or the upload of the deleted or modified data to the storage service through the synchronization process. The process may then repeat at operation 504 when another attempted operation performed on the portion of data is detected. If the second elevated authentication process is validated 518 by the storage service and/or the separate authentication service, the storage service may enable the attempted operation to be performed 510, and the portion of the data may be deleted or modified at the storage service. Additionally, if the attempted operation was performed on the portion of data at one of the devices, the hold placed on the synchronization process may be removed. In some embodiments, if the second authentication process is validated 518, the data protection feature for the portion of data may be automatically de-selected or disabled such that the portion of data stored at the storage service is no longer protected from deletions or modifications. Therefore, the process may then repeat at operation 502, when another selection of the data protection feature is received.

The examples provided in FIGS. 1 through 5 are illustrated with specific systems, services, applications, modules, and notifications. Embodiments are not limited to environments according to these examples. Provision and implementation of protection features for data stored at a cloud-based storage service may be implemented in environments employing fewer or additional systems, services, applications, engines, and user experience configurations. Furthermore, the example systems, services, applications, modules, and notifications shown in FIG. 1 through 5 may be implemented in a similar manner with other values using the principles described herein.

Figure 6:
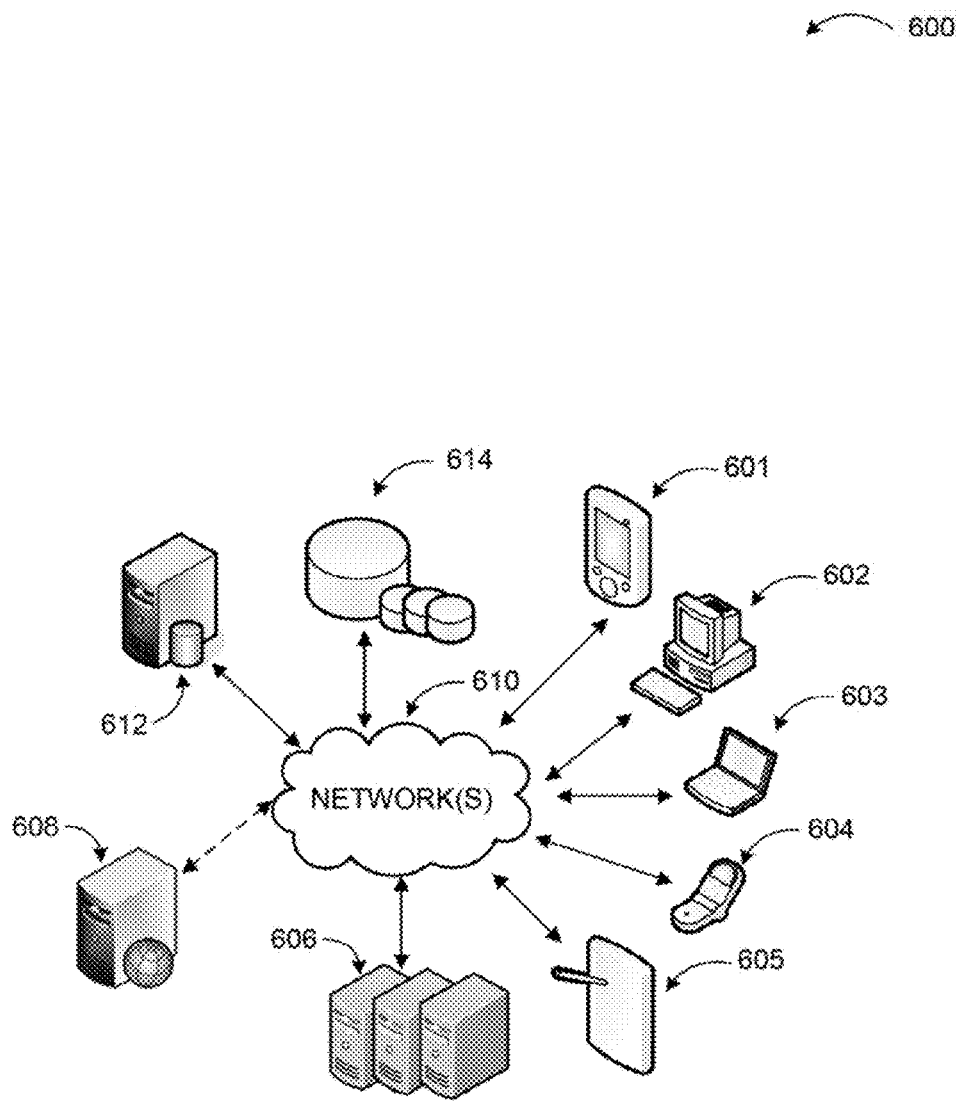
FIG. 6 is a networked environment, where a system according to embodiments may be implemented.

FIG. 6 is a networked environment, where a system according to embodiment be implemented. In addition to locally installed applications (for example, application 106 or synchronization client 206), a data protection module (for example, data protection module 118) may also be employed in conjunction with hosted applications and services (for example, a storage service 114) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed for provision and implementation of protection features for data stored at a storage service. Furthermore, the networked environments discussed in FIG. 6 are for illustration purposes only. Embodiments are not limited to the example applications, engines, or processes.

Figure 7:
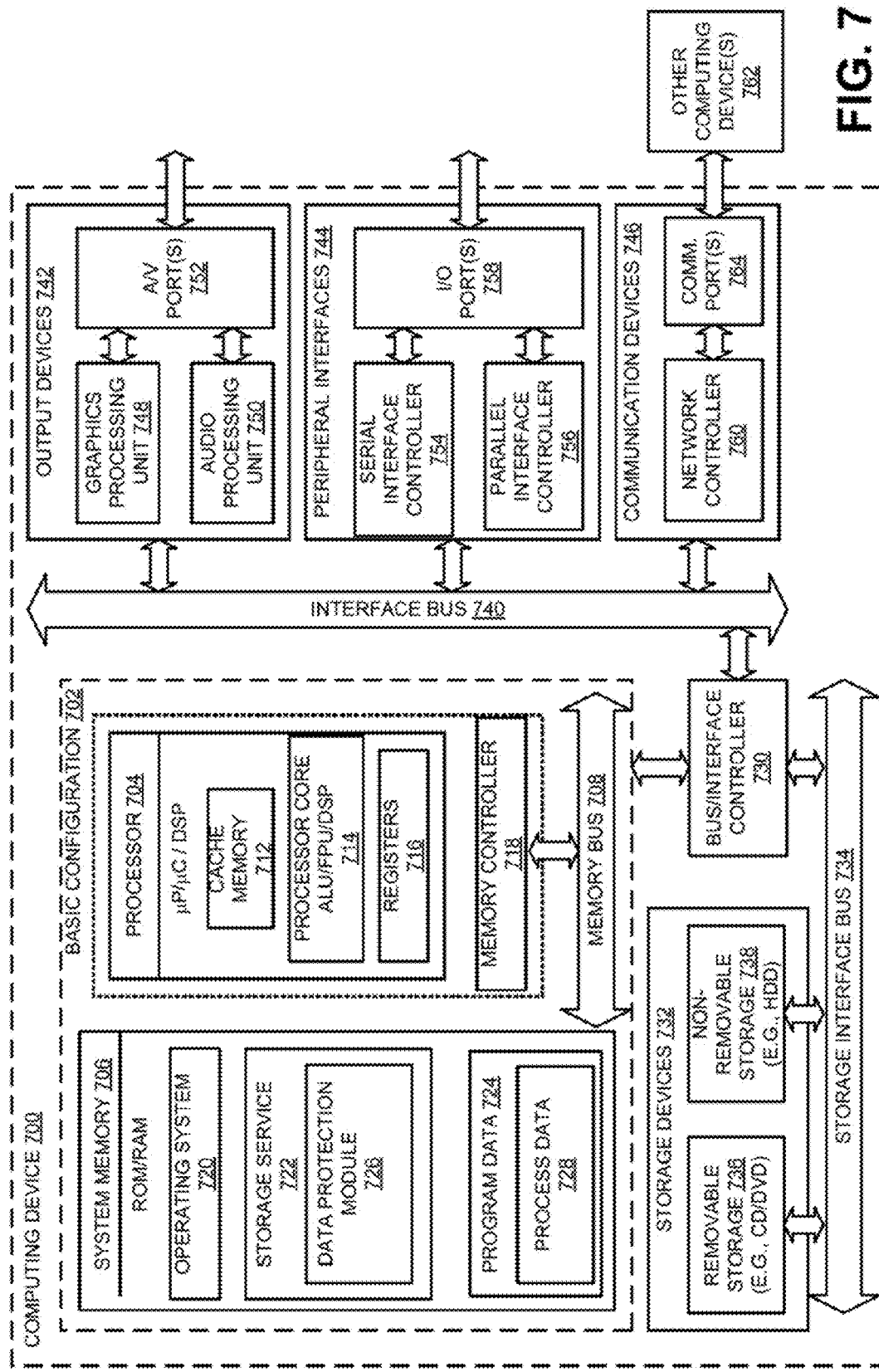
FIG. 7 is a block diagram of an example general purpose computing device, which may be used to provide and implement protection features for data stored at a storage service.

FIG. 7 is a block diagram of an example general purpose computing device, which may be used to provide and implement protection features for data stored at a storage service.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a storage service 722, and program data 724. The storage service 722 (or a client application associated with the storage service 722) may include a data protection module 726, which may be an integrated module of the storage service 722. Access to data stored at the storage service 722 may be subject to a first authentication process. In one embodiment, the storage service 722 and/or data protection module 726 may be configured to provide a selectable data protection feature for a portion of data stored at the storage service 722, and may receive a selection of the data protection feature. In another embodiment, the storage service 722 and/or data protection module 726 may be configured to automatically select the data protection feature for the portion of data stored at the storage service 722. The data protection feature may include elevation of the first authentication process. The storage service 722 and/or data protection module 726 may then detect an attempted operation performed on the portion of data at the storage service and/or at a device on which the portion of the data is stored locally. In response to a determination that the attempted operation is deletion or modification of the portion of data, the storage service 722 and/or data protection module 726 may prompt a second authentication process to enable the attempted operation to be performed on the portion of data at the storage service. The second authentication process may be elevated compared to the first authentication process. The program data 724 may include, among other data, process data 728, such as the data stored at the storage service 722, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via on more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to provide and implement protection features for data stored at a storage service. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by preselected criteria that may be machine automated.

Figure 8:
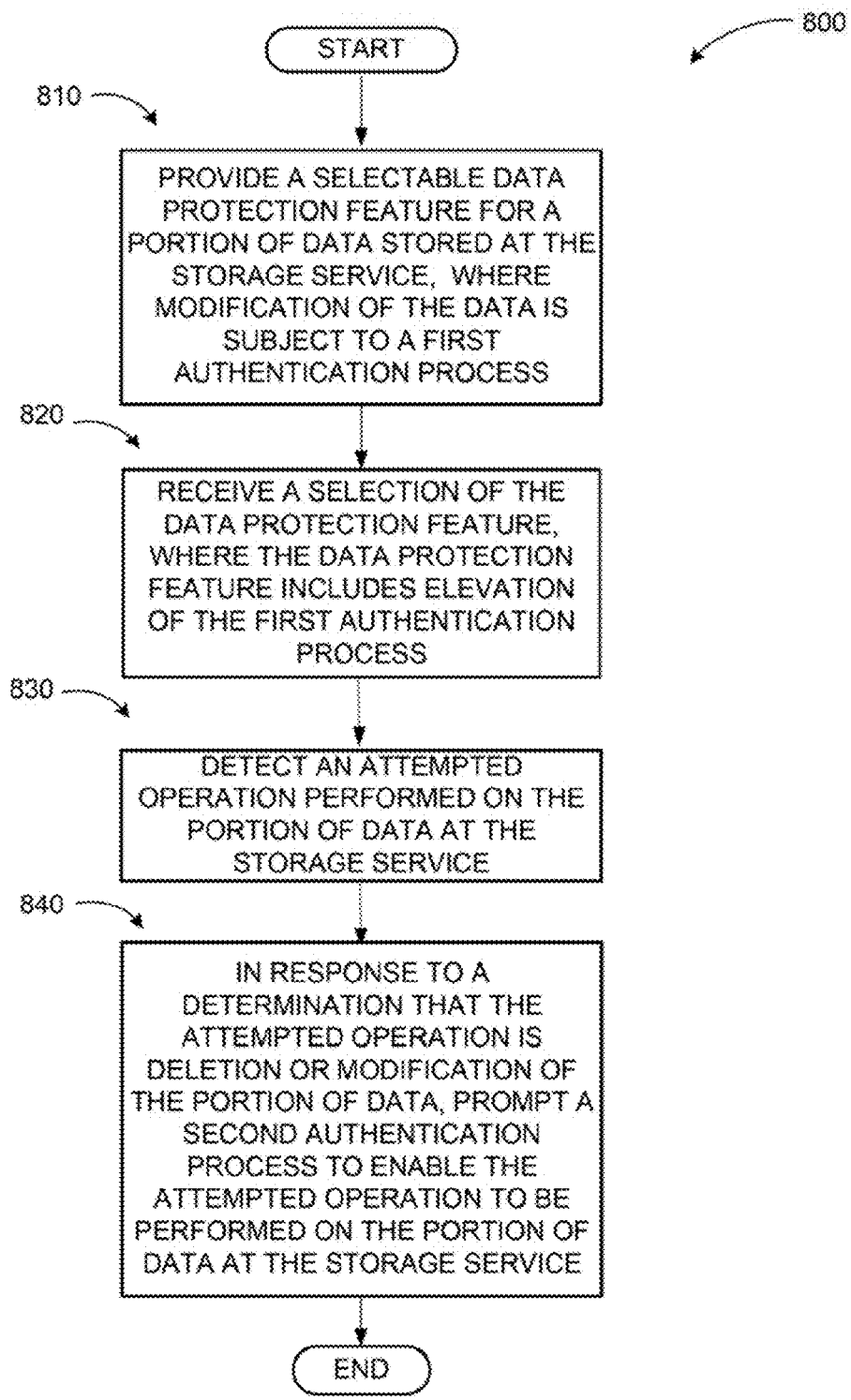
FIG. 8 illustrates a logic flow diagram of a method to provide and implement protection features for data stored at a storage service, according to embodiments.

FIG. 8 illustrates a logic flow diagram of a method to provide and implement protection features for data stored at a storage service, according to embodiments.

Process 800 may be implemented on a computing device, server, or other system. An example system may include a server comprising a communication interface to facilitate communication between a storage service and one or more devices, a memory, and one or more processors. The processors may be configured to, in conjunction with the memory, execute a storage service provided to enable storage and/or sharing of data across multiple devices and users, where access to the data stored at the storage service may be subject to a first authentication process. The storage service may also be configured to provide and implement protection features for data stored at a storage service to prevent accidental or nefarious deletions and/or modifications of the data from being executed at the storage service, where the protection features may include elevation of the first authentication process.

Process 800 begins with operation 810, where the storage service may be configured to provide a selectable data protection feature for a portion of data stored at the storage service. The selectable data protection feature may be provided to a user and/or an administrator of the data, for example. The selectable data protection feature may be provided through a web application, an application programming instance (API), or a synchronization client executing on the device. Alternately, the selectable data protection feature may be provided through a mobile device via SMS, for example.

At operation 820, the storage service may receive a selection of the data protection feature. In some examples, upon selection, the storage service may prompt an authentication process with higher elevation than the first authentication process to enable the feature. This authentication process may be similar to the second authentication process discussed below in conjunction with operation 840. Alternatively, to operation 810 and 820, the storage service may be configured to automatically select the data protection feature for the portion of data stored at the storage service based on a particular type of data within the portion of data and/or by employing machine learning, among other examples.

At operation 830, the storage service may detect an attempted operation performed on the portion of data at the storage service. The attempted operation may be an addition of new data to the portion of data, a deletion of the portion of data, and/or a modification of the portion of data, such as edits to the portion of data or movement of the portion of data to a new location. In another embodiment, the storage service may detect an attempted operation performed on the portion of data at a device on which the portion of the data is stored locally. For example, the attempted operation may be performed at the device and provided to the storage service through a synchronization process (e.g., via a synchronization client being executed on the device).

At operation 840, in response to a determination that the attempted operation is deletion or modification of the portion of data, the storage service may prompt a second authentication process to enable the attempted operation to be performed on the portion of data at the storage service. The second authentication process may be elevated compared to the first authentication process. For example, the first authentication process may include a single-factor password authentication, whereas the second authentication process may include two-factor authentication, multi-device or multi-application authentication, biometric authentication, and/or smart card authentication. In some embodiments, the storage service may provide an error notification that includes an option to de-select or disable the data protection feature for the portion of data, where the storage service prompts the second authentication process if the option to de-select or disable the data protection feature is selected.

The operations included in process 800 are for illustration purposes. Provision and implementation of protection features for data stored at the storage service implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, a means for providing a data protection feature for a storage service is described. The means may include a means for providing a selectable data protection feature for a portion of data stored at the storage service, where access to the data is subject to a first authentication process; a means for receiving a selection of the data protection feature, where the data protection feature includes elevation of the first authentication process; a means for detecting an attempted operation performed on the portion of data at the storage service; and in response to a determination that the attempted operation is deletion or modification of the portion of data, a means for prompting a second authentication process to enable the attempted operation to be performed on the portion of data at the storage service, where the second authentication process is elevated compared to the first authentication process.

According to some examples, a method to provide a data protection feature for a storage service is described. The method may include providing a selectable data protection feature for a portion of data stored at the storage service, where access to the data is subject to a first authentication process; receiving a selection of the data protection feature, where the data protection feature includes elevation of the first authentication process; detecting an attempted operation performed on the portion of data at the storage service; and in response to a determination that the attempted operation is deletion or modification of the portion of data, prompting a second authentication process to enable the attempted operation to be performed on the portion of data at the storage service, where the second authentication process is elevated compared to the first authentication process.

According to other examples, the method may also include providing the selectable data protection feature to and receiving the selection of the data protection feature from a user or an administrator associated with the portion of data. The method may further include prompting the second authentication process to enable the selection of the data protection feature, where the second authentication process to enable the selection of the data protection feature is one of: a same type of elevated authentication employed by the second authentication process to enable the attempted operation and a different type of elevated authentication.

According to further examples, the method may include automatically selecting the data protection feature for the portion of data based on a type of the data and/or in response to a determination that the attempted operation is deletion or modification of the portion of data, providing to be displayed an error notification. The notification may include an option to de-select the data protection feature for the portion of data. The method may also include if the option to de-select the data protection feature is selected, prompting the second authentication process to enable the attempted operation to be performed on the portion of data at the storage service. The method may further include in response to a determination that the attempted operation is addition of new data to the portion of data, enabling the attempted operation to be performed on the portion of data at the storage service.

According to other examples, a server to execute a storage service configured to provide a data protection feature for data stored at the storage service is described. The server may include a communication interface configured to facilitate communication between the storage service and a device; a memory configured to store instructions; and one or more processors coupled to the memory. The one or more processors, in conjunction with the instructions stored in the memory, may be configured to provide a selectable data protection feature for a portion of data stored at the storage service to the device for display, where access to the data is subject to a first authentication process; receive a selection of the data protection feature from the device, where the data protection feature includes elevation of the first authentication process; detect an attempted operation performed on the portion of data at the storage service; and in response to a determination that the attempted operation is deletion or modification of the portion of data, prompt a second authentication process to enable the attempted operation to be performed on the portion of data at the storage service, where the second authentication process is elevated compared to the first authentication process.

According to some examples, the portion of data may include all data, a file, a folder, groups of files, or groups of folders stored at the storage service. The first authentication process may include a single-factor authentication, and the second authentication process comprises at least one of a two-factor authentication, a multi-factor authentication, a multi-device authentication, a multi-application authentication, biometric authentication, and a smart card authentication. The one or more processors may be further configured to detect an attempted operation performed on the portion of data that is locally stored at the device, where the attempted operation is provided to the server through a synchronization process.

According to other examples, the one or more processors may also be configured to in response to a determination that the attempted operation is addition of new data to the portion of data, upload the new data to the portion of data stored at the storage service through the synchronization process. The processors may also in response to a determination that the attempted operation is deletion or modification of the portion of data, prevent an upload of deleted or modified data to the portion of data stored at the storage service through the synchronization process. Validation of the prompted second authentication process may be performed by one or both of the server and a separate authentication server. The selectable data protection feature may be provided and the selection of the data protection is received through one or more of a web application, an application programming instance (API), and a synchronization client executing on the device or a mobile device.

According to further examples, a method to provide a data protection feature for data stored at a storage service is described. The method may include automatically selecting a data protection feature for a portion of data stored at the storage service, where access to the data is subject to a first authentication process and the data protection feature includes elevation of the first authentication process; detecting an attempted operation performed on the portion of data at the storage service; and in response to a determination that the attempted operation is deletion or modification of the portion of data, prompting a second authentication process to enable the attempted operation to be performed on the portion of data at the storage service, where the second authentication process is elevated compared to the first authentication process.

According to yet other examples, the method may also include in response to a determination that the attempted operation is deletion or modification of the portion of data, providing to be displayed an error notification that includes an option to de-select the data protection feature for the portion of data; and if the option to de-select the data protection feature is selected, prompting the second authentication process to enable the attempted operation to be performed on the portion of data at the storage service. The method may further include providing a selectable data protection feature for another portion of data stored at the storage service and/or receiving a selection of the data protection feature from one of a user and an administrator associated with the portion of data, where the second authentication process is prompted to enable the selection of the data protection feature.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide a data protection feature for a storage service, the method comprising:
   detecting an attempted operation to be performed on a portion of data as stored locally on a device;
   in response to the attempted operation being a new data addition operation and based on a first authentication process, performing the new data addition operation on the portion of data as stored locally on the device and synchronizing the portion of data, as updated per the new data addition operation, at a storage service; and
   in response to the attempted operation being a deletion operation,
      performing the deletion operation on the portion of data as stored locally on the device based on the first authentication process and placing a hold on synchronization of the portion of the data, as updated per the deletion operation, at the storage service;
      prompting a second authentication process, wherein the second authentication process is elevated compared to the first authentication process; and
      in response to the second authentication process being validated, removing the hold on synchronization at the storage service and synchronizing the portion of data, as updated per the deletion operation, at the storage service.

2. The method of claim 1, further comprising:
   providing a selectable data protection feature to a user or an administrator for the portion of data stored at the storage service; and
   receiving a selection of the data protection feature from the user or the administrator associated with the portion of data, wherein the data protection feature includes elevation of the first authentication to the second authentication process.

3. The method of claim 2, further comprising:
   prompting the second authentication process to enable the selection of the data protection feature.

4. The method of claim 2, further comprising:
   providing to be displayed an error notification in response to detecting the deletion operation to be performed on the portion of the data.

5. The method of claim 4, wherein the error notification includes an option to de-select the data protection feature for the portion of data.

6. The method of claim 5, further comprising:
   detecting a deselection of the data protection feature; and
   prompting the second authentication process to allow the deselection of the data protection feature for the portion of data to be performed.

7. A server to execute a storage service configured to provide a data protection feature for data stored at the storage service, the server comprising:
   a memory configured to store instructions; and
   one or more processors coupled to the memory, the one or more processors, in conjunction with the instructions stored in the memory, are configured to:
      detect an attempted operation to be performed on a portion of data as stored locally on a device;
      in response to the attempted operation being a new data addition operation and based on a first authentication process, perform the new data addition operation on the portion of data as stored locally on the device and synchronizing the portion of data, as updated per the new data addition operation, at a storage service; and
      in response to the attempted operation being a deletion operation,
         perform the deletion operation on the portion of data as stored locally on the device based on the first authentication process and placing a hold on synchronization of the portion of the data, as updated per the deletion operation, at the storage service;
         prompt a second authentication process, wherein the second authentication process is elevated compared to the first authentication process by being based on a second type of factor different than the first type of factor associated with the first authentication process or being based on more factors than the first authentication process; and
         in response to the second authentication process being validated, remove the hold on synchronization at the storage service and synchronizing the portion of data, as updated per the deletion operation, at the storage service.

8. The server of claim 7, wherein the portion of data is one of: all data, a file, a folder, groups of files, and groups of folders stored at the storage service.

9. The server of claim 7, wherein the first authentication process comprises a single-factor authentication, and the second authentication process comprises at least one of a two-factor authentication, a multi-factor authentication, a multi-device authentication, a multi-application authentication, biometric authentication, and a smart card authentication.

10. The server of claim 7, wherein validation of the prompted second authentication process is performed by one or both of the server and a separate authentication server.

11. The server of claim 7, wherein the one or more processors are further configured to provide a selectable data protection feature for the portion of data stored at the storage service:

receive a selection of the data protection feature for the portion of data stored at the storage service, wherein the data protection feature includes elevation of the first authentication process to the second authentication processor;

wherein the selectable data protection feature is provided and the selection of the data protection is received through one or more of a web application, an application programming instance (API), and a synchronization client executing on a device.

12. A method to provide a data protection feature for data stored at a storage service, the method comprising:

detecting an attempted operation to be performed on a portion of data as stored locally on a device;

in response to the attempted operation being a new data addition operation and based on a first authentication process, performing the new data addition operation on the portion of data as stored locally on the device and synchronizing the portion of data, as updated per the new data addition operation, at a storage service; and in response to the attempted operation being a deletion operation, performing the deletion operation on the portion of data as stored locally on the device based on the first authentication process and placing a hold on synchronization of the portion of the data, as updated per the deletion operation, at the storage service;

prompting a second authentication process, wherein the second authentication process is elevated compared to the first authentication process by being based on a second type of factor different than the first type of factor associated with the first authentication process or being based on more factors than the first authentication process; and in response to the second authentication process being validated, removing the hold on synchronization at the storage service and synchronizing the portion of data, as updated per the deletion operation, at the storage service.

13. The method of claim 12, further comprising:

automatically selecting a data protection feature for the portion of data stored at the storage service, wherein the data protection feature includes elevation of the first authentication process to the second authentication processor;

providing to be displayed an error notification that includes an option to de-select the data protection feature for the portion of data in response to detecting the deletion operation to be performed on the portion of the data;

detecting a deselection of the data protection feature; and prompting the second authentication process to allow the deselection of the data protection feature for the portion of data to be performed.

14. The method of claim 13, further comprising:

receiving a selection of the data protection feature for the other portion of data stored at the storage service from one of a user and an administrator associated with the portion of data, wherein the second authentication process is prompted to enable the selection of the data protection feature.

* * * * *